United States Patent [19]
Studen

[11] 3,933,571
[45] Jan. 20, 1976

[54] SEALING APPARATUS UTILIZING ADJUSTABLE JAW PORTIONS

[75] Inventor: Charles E. Studen, Highland Heights, Ohio

[73] Assignee: Donray Products Company, Cleveland, Ohio

[22] Filed: May 21, 1973

[21] Appl. No.: 361,977

Related U.S. Application Data

[62] Division of Ser. No. 183,102, Sept. 23, 1971, abandoned.

[52] U.S. Cl. ............... 156/583; 100/226; 100/232; 428/192
[51] Int. Cl.² ... B30B 7/04; B32B 3/02; B32B 31/20
[58] Field of Search .......... 156/228, 306, 553, 580, 156/581, 583; 161/127, 149, 159; 100/226, 232; 428/178, 192, 304

[56] References Cited
UNITED STATES PATENTS

| | | | |
|---|---|---|---|
| 2,405,675 | 8/1946 | Southwick et al. | 156/583 X |
| 2,849,050 | 8/1958 | Meyerson | 156/530 |
| 3,503,838 | 3/1970 | Marshack | 161/120 |

Primary Examiner—Douglas J. Drummond
Assistant Examiner—Robert A. Dawson
Attorney, Agent, or Firm—John H. Mulholland

[57] ABSTRACT

The specification and drawings disclose a method and apparatus of forming foam plastic envelopes by simultaneously engaging two juxtaposed sheets of foam plastic with at least three pairs of opposed jaw members positioned to fully define three marginal edges of an envelope. As shown, the jaw members are positioned in a generally U-shaped pattern so that each pair of jaws completely defines a separate marginal edge. The preferred apparatus of the invention includes first and second opposed platens mounted for movement between a first position in which they are spaced a substantial distance apart and a second position wherein they are relatively closely spaced. Each platen carries at least three jaws including two elongated, spaced, side-by-side jaws and one intermediate jaw which extends transversely between the side-by-side jaws. The jaws on each platen are aligned with corresponding jaws on the opposed platen so that upon relative movement of the platens to the second position, the jaws come into cooperating relationship. Additionally, means are provided for permitting adjustment longitudinally of the side-by-side jaws.

5 Claims, 7 Drawing Figures

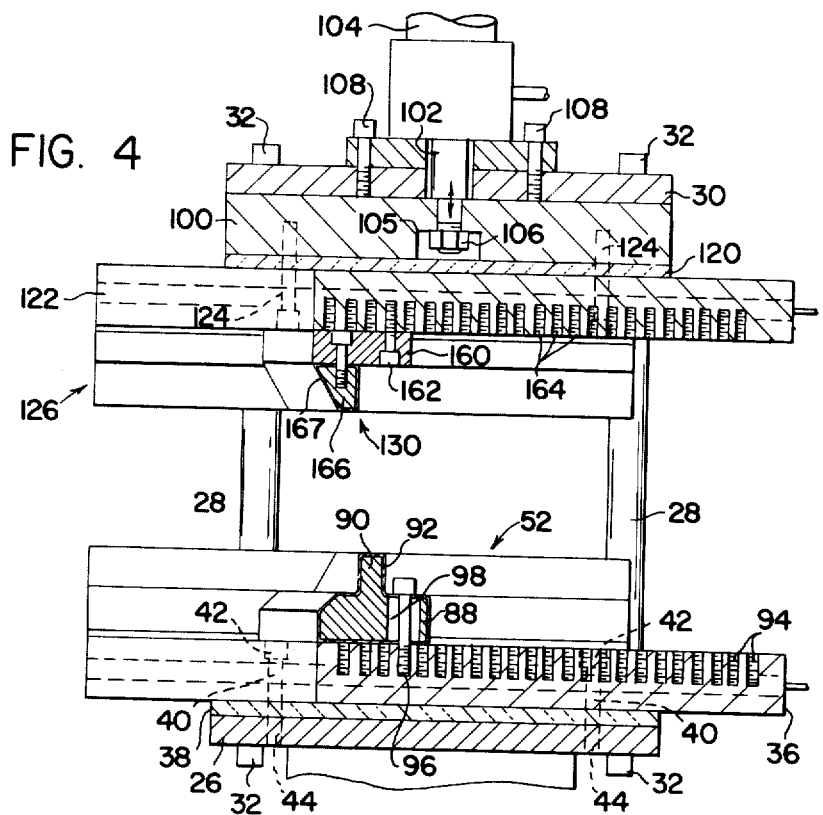
FIG. 4
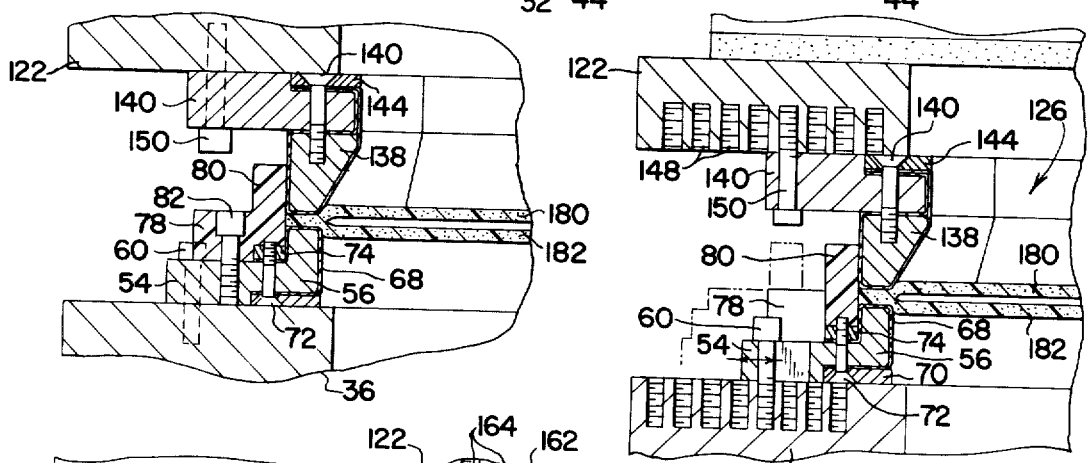
FIG. 5
FIG. 6
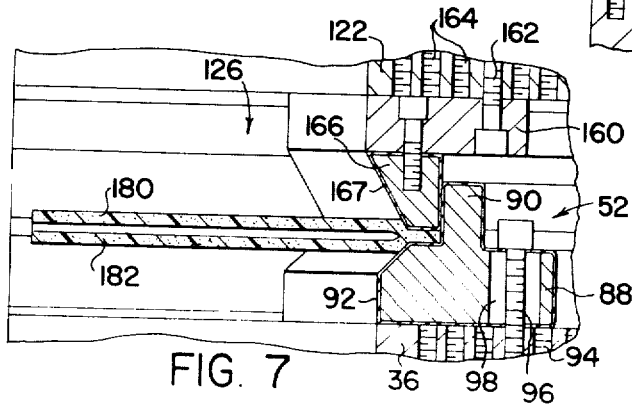
FIG. 7

SEALING APPARATUS UTILIZING ADJUSTABLE JAW PORTIONS

This is a division of application Ser. No. 183,102, filed Sept. 23, 1971 and now abandoned.

This invention is concerned with a sealing apparatus and, more particularly, to an apparatus for forming plastic bags or envelopes.

The invention is especially suited for forming packaging envelopes from foamed or expanded plastics such as polyethylene, polystyrene or polyurethane, and will be described with particular reference thereto; however, as will become apparent, the invention is capable of broader application and could be used for making similar articles from many types of heat or ultrasonically sealable materials.

Envelopes formed from expanded plastic sheets are used widely for packaging many fragile machine parts, electronic components, and the like. For the most satisfactory protection, each part or component should have a custom sized envelope. Consequently, the envelopes must be made in a wide range of sizes.

In the past, the envelopes were typically made by use of a pair of heated or ultrasonic jaws which were actuated against superposed sheets of foam plastic to produce the required seams. For the conventional envelope having three side seams, this required three separate movements of the plastic sheets and three actuations of the jaws. Sometimes, depending upon the type and size of the envelope, and the size of the jaws, additional sheet movement and jaw actuation was required.

The subject invention provides a method and apparatus by which the entire envelope can be made at once with a single jaw actuation and without moving the sheets. Additionally, apparatus formed in accordance with the invention can be rapidly adjusted for making envelopes of substantially any size.

According to one aspect, the invention contemplates a method of forming foam plastic envelopes by simultaneously engaging two juxtaposed sheets of foam plastic with at least three pairs of opposed jaw members positioned to fully define three marginal edges of an envelope. Preferably, the jaw members are positioned in a generally U-shaped pattern so that each pair of jaws completely defines a separate marginal edge.

The apparatus of the invention includes first and second opposed platens mounted for movement between a first position in which they are spaced a substantial distance apart and a second position wherein they are relatively closely spaced. Each platen carries at least three jaws including two elongated, spaced, side-by-side jaws and one intermediate jaw which extends transversely between the side-by-side jaws. The jaws on each platen are aligned with corresponding jaws on the opposed platen so that upon relative movement of the platens to the second position, the jaws come into cooperating relationship. Preferably, means are provided for permitting adjustment longitudinally of the side-by-side jaws.

As can be appreciated, a single actuation of the platens will seal all three marginal edges of an envelope. Moreover, by simple adjustment of the intermediate jaws, envelopes of a wide range of lengths can be manufactured.

The invention also contemplates that means will be provided for permitting adjustment of the spacing between the side-by-side jaws. Additionally, a series of intermediate jaws of various lengths will be provided so that by changing the intermediate jaws, envelopes of varying width can be produced.

Accordingly, a primary object of the invention is the provision of a method and apparatus by which heat or ultrasonically sealed foam plastic envelopes can be manufactured with a single actuation of a set of cooperating heated jaws.

Yet another object is the provision of apparatus of the type described which can be quickly adjusted for making envelopes of a wide range of sizes.

A further object is the provision of heat sealing apparatus wherein cooperating jaws can simultaneously heat seal the entire marginal edge of a foam plastic envelope without movement or repositioning of the plastic sheets.

The above and other objects and advantages will become apparent from the following description when read in conjunction with the accompanying drawings wherein:

FIG. 4 is a cross-sectional view taken on line 4—4 of FIG. 2;

FIG. 5 is a cross-sectional view taken on line 5—5 of FIG. 2 but showing the jaws in a closed position;

FIG. 6 is a cross-sectional view taken on line 6—6 of FIG. 2; and,

FIG. 7 is a cross-sectional view taken on line 7—7 of FIG. 2.

Figure 1:
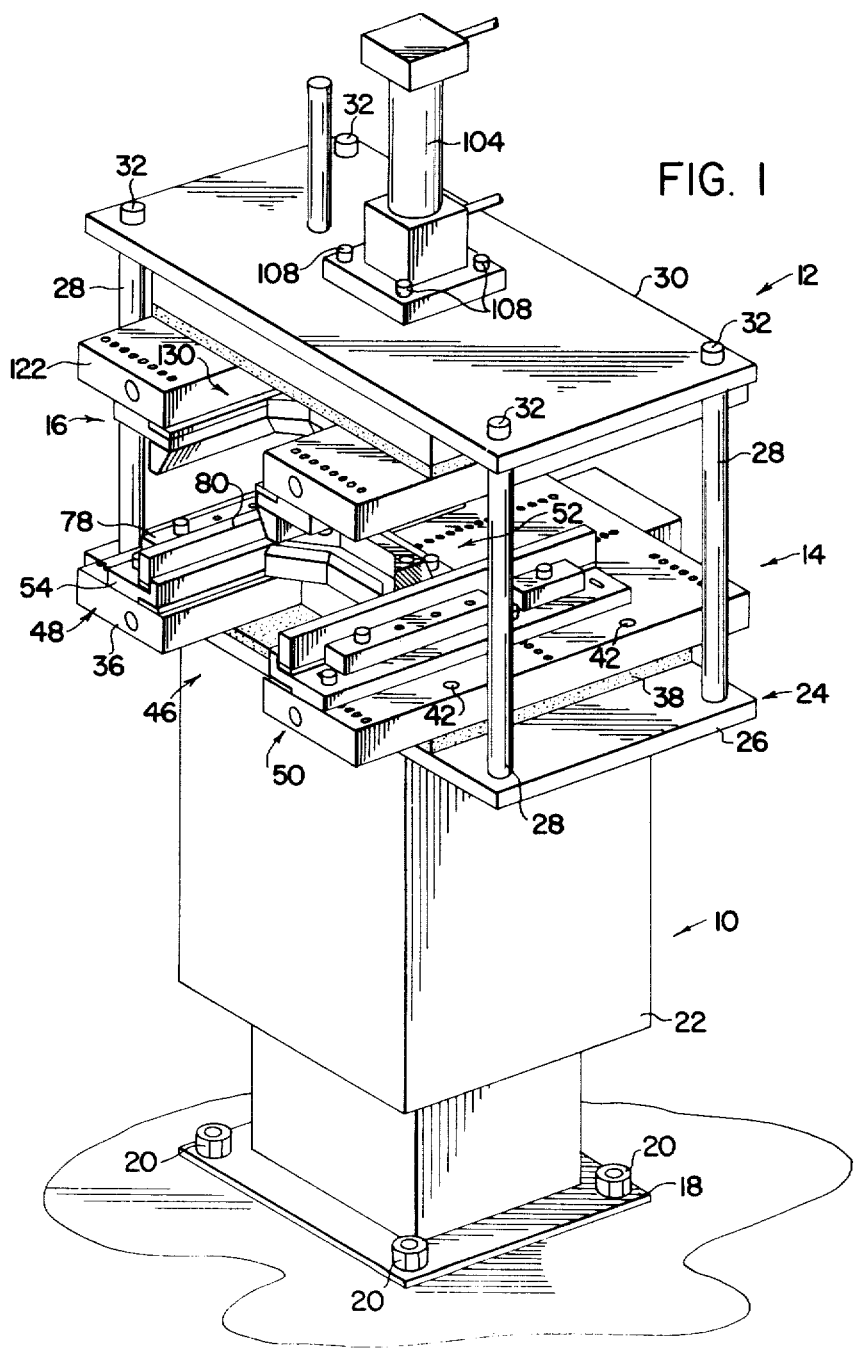
FIG. 1 is a pictorial view showing a preferred form of heat sealing apparatus embodying features of the invention.

Referring more particularly to FIG. 1, the overall arrangement of the apparatus is shown as comprising a base and control assembly 10 which supports a frame and platen assembly 12. Although the frame and platen assembly 12 will subsequently be described in great detail, for present purposes, it is sufficient to note that it includes a stationary lower platen assembly 14 and a vertically reciprocal upper platen assembly 16. Each of the platen assemblies 14 and 16 include jaw members arranged to cooperate for sealing three edges about a pair of sheets of foamed plastic or the like. In the apparatus shown, the jaws are electrically heated; however, it should be understood that the apparatus is equally capable of use with ultrasonic jaws or any other method of sealing or joining polymers.

The base assembly 10 forms no particular part of the invention and could take a variety of forms. Broadly, it is shown as comprising a base plate member 18 which is preferably connected to a floor or foundation in any convenient manner such as through the use of the stud bolts and nuts 20. Extending upwardly from base 18 is a support frame and housing 22 formed in a conventional manner from structural members and sheet metal or the like. The housing contains the various electrical and hydraulic control systems for the unit. The control systems are conventional and include means for controlling the temperature of the heated jaws, as well as, the pressure and duration of their actuation. Controls of this type are well known and further description is unnecessary.

Carried on the housing and frame 22 is the platen and frame assembly 12 which includes a relatively conventional frame 24 comprising a heavy base member 26 positively connected to, and carried from the housing 22. Four tie rods 28 extend vertically upward from each of the corners of the base of the plate 26. Supported at the upper ends of the tie rods 28 is an upper frame plate 30 which is shown merely as a heavy metal plate positively connected to the tie rods. In the embodiment under consideration, the plates 26, 30 are connected to the tie rods 28 through the use of large socket head machine screws 32 which pass through openings in the plates into tapped openings in the ends of the tie rods.

Figures 2, 3:
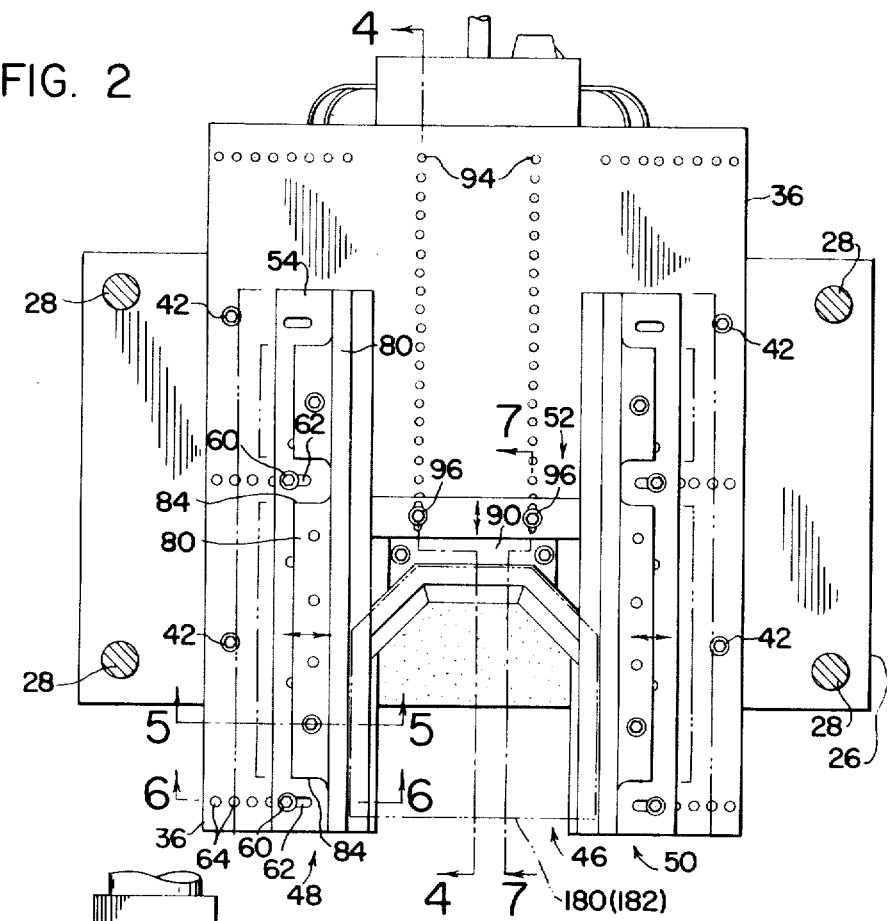
FIG. 2 is a plan view of the lower platen of the apparatus shown in FIG. 1.
FIG. 3 is a front elevation of the apparatus shown in FIG. 1.

The lower platen assembly 14 is supported from plate 26 and is preferably positively connected thereto. As shown in FIGS. 1 through 3, the lower platen assembly includes a first relatively thick plate member 36. Plate 36 is positioned on plate 26 and spaced slightly therefrom by a heavy pad of asbestos or similar insulating material 38 (see FIG. 4). The plate 36 is shown connected to the plate 26 by a plurality of socket head machine screws 40 which are positioned in counterbored openings 42 and extend into tapped openings 44 in plate 26. As best shown in FIGS. 1 and 2, plate 36 is of generally U-shaped configuration in plan view and has a cut out opening 46 which extends inwardly from the front edge. Heat sealing clamp bar assemblies 48, 50 and 52 are carried on the plate 36 and adjustably positioned about the opening 46. As will be hereafter discussed at length, the clamp bar assemblies 48 and 50 are adjustably mounted on the plate 36 and extend in spaced apart, parallel relationship. In the embodiment under consideration, each of the clamp bar assemblies 48 and 50 are of like construction but mirror images of one another. Accordingly, only clamp bar assembly 48 will be described in detail and the description thereof is to be taken as equally applicable to the clamp bar assembly 50, except as otherwise noted.

As shown, the clamp bar assembly 48 comprises a first elongated bar member 54 having a laterally and upwardly extending L-shaped jaw member 56 (see FIGS. 3, 5 and 6). The upwardly extending leg of the L-shaped jaw 56 is heated by conventional resistance heating elements carried therein but not shown in the drawings. The bar 54 is adjustably connected to the plate 36 so that it may be moved laterally to vary the spacing between the bar assemblies 48 and 50 and, consequently, the distance between the side seams of a foam bag or envelope being formed. In the subject embodiment, the adjustable mounting comprises socket head machine screws 60 which pass through elongated transverse slots 62 formed in bar 54. The plate 36 is provided with two rows of spaced tapped openings 64 positioned to receive the screws 60. By removing the screws 60, the bar 54 can be adjusted to any desired position. The elongated slots 62 in combination with the spaced openings 64 permits substantially infinite adjustment of the bar across the width of plate 36 adjacent the opening 46.

The heated L-shaped jaw portion 56 of the bar 54 is preferably covered with a layer of Teflon impregnated glass fabric or the like 68 to prevent sticking of the plastic sheet material. FIGS. 3, 5 and 6 illustrate the fabric wrapped about the clamp or the jaw portion of the bar. Note that a clamp bar 70 extends under the lower portion of jaw portion 56 and a screw or machine bolt 72 passes upwardly through the clamp bar 70. The upper edge portion of the fabric is held by the nut 74 engaged with the corresponding bolt 72. Positioned over the bar 54 and arranged to serve as a guide for the upper jaw is a generally L-shaped bar 78 formed from Teflon or the like. The vertically extending leg 80 of bar 78 is aligned with the back surface of the heated bar 56. As best shown in FIGS. 2 and 5, the bar 80 is affixed to the bar 54 by a plurality of socket head machine screws 82 which are received within counterbored openings formed in bar 80 and pass downwardly into tapped openings in bar 54. As shown in FIG. 2, bar 80 is cut away at portions 84 so as to provide access to the adjusting screws 60. Thus, adjustment of the jaw assembly 48 can take place without changing or shifting location of the bar 80.

As previously mentioned, the clamp jaw assembly 50 is identical to assembly 48 but is a mirror image thereof. As can be appreciated, the assemblies 48 and 50 can be adjusted laterally to any desired spacing so that the width of the foam bag or envelope being made can be varied.

The intermediate clamp jaw assembly 52 is positioned to extend transversely between the jaw assemblies 48 and 50. It is also arranged for adjustable movement along a line parallel to the faces of the jaw assemblies 48, 50. Specifically, as best shown in FIGS. 2, 4 and 7, jaw assembly 52 comprises a bar member 88 having a somewhat C-shape in plan view and including an upwardly extending leg 90. Bar member 88 is heated by electrical resistance heaters (not shown) and, additionally, is wrapped in Teflon impregnated fabric 92.

In the embodiment shown, adjustment of the bar 88 so that it can be moved along the plate 36 is permitted by a series of tapped openings 94 positioned in two side-by-side rows across the depth of the plate 36. Suitable socket head machine screws 96 pass through elongated slots 98 (see FIG. 4) in the bar 88 to clamp the bar to the plate 36. By releasing the machine screws 96, the position of bar 88 can be adjusted. It should be appreciated that a series of bars formed similar to bar 88 would normally be provided so that when the assemblies 48 and 50 are adjusted laterally outward, different ones of the series of bars 88 can be installed to extend completely across the width between the assemblies 48, 50. Additionally, it should be understood that the bar assemblies 48, 50 can be provided in different lengths from that shown. In the embodiment under consideration, the assemblies 48, 50 extend only part way across the depth of the plate 36 but could extend completely across or even outwardly slightly beyond the limits of the plate 36.

As previously mentioned, the upper platen assembly 60 is arranged for vertical reciprocation toward and away from the lower platen assembly 14. For this reason, the upper platen assembly comprises a first relatively heavy frame member 100 which is, as best shown in FIG. 4, connected to the lower end of piston rod 102 of fluid cylinder 104. In the embodiment shown, the plate 100 is provided with a centrally located counterbored opening 105 which receives the threaded lower end of the piston rod 102. A nut 106 clamps the plate 100 against a shoulder formed on the piston rod 102. Fluid cylinder 104 is carried on the top surface of the frame plate 30 and is releasably connected thereto by four socket head machine screws 108 which pass through openings in the end plate of the piston into tapped openings in plate 30. As is well known, by controlling the supply of fluid in cylinder 104, the plate 100 is caused to move vertically.

The plate 100 is guided during its vertical movement by a guide rod 110 which is connected to the plate and extends vertically upward therefrom through machined opening 112 in plate 30. This arrangement is best shown in FIG. 3. As is readily apparent, the guide rod 110 allows reciprocation of plate 100 but prevents it from having any horizontal movement or shifting.

Carried from plate 100 and releasably connected thereto is the upper clamp or sealing jaw assembly 16. As shown in FIGS. 3 and 4, a heavy sheet of asbestos or similar insulating material 120 is positioned on the lower face of plate 100. A heavy mounting plate 122 adjustably supports the jaw assemblies and is connected to plate 100 by vertically extending socket head machine screws 124 which extend upwardly through plate 122 into tapped openings in plate 100.

Adjustably carried from the plate 122 are the cooperating heated jaw assemblies 126, 128 and 130. The jaw assemblies 126 and 128 extend in spaced apart, parallel relationship from the front to the rear of plate 122. As best shown in FIGS. 1 and 3, the assemblies 126 and 128 extend on opposite sides of a cutout 132 formed inwardly from the front surface of the plate 122. The intermediate jaw assembly 130 extends transversely between the plates 126 and 128 at the rear of opening or cutout 130. Each of the jaw assemblies 126 and 128 are of the same construction but are merely mirror images of one another. Accordingly, only jaw assembly 126 will be described in detail but the description thereof is to be taken as equally applicable to assembly 128 unless otherwise noted.

Specifically, assembly 126 comprises an elongated heated jaw member 138 which has the cross-sectional shape best seen in FIG. 3. Note that it is somewhat trapezoidal with its inclined surface facing inwardly. The heated bar 138 is wrapped in Teflon coated glass fabric and is connected to a second elongated bar 140 by a machine screw 142 which extends downwardly through bar 140 into threaded openings in the heated bar 138. The Teflon coated fabric is clamped in position by a clamp bar 144 as best shown in FIGS. 5 and 6.

Adjustment of the jaw assembly 126 is provided by two rows of tapped openings 148 formed in plate 122. Machine screws 150 extend upwardly through the bar 140 into the openings 148. As can be appreciated, removing the screws 150 allows the bar 140a and the heated bar 138 to be shifted laterally to any desired position. As mentioned earlier, the assembly 128 is substantially identical other than being a mirror image of assembly 126. Extending between assemblies 126 and 128 at the rear of opening 131 is the assembly 130. Assembly 130 comprises a first bar or plate member 160 which is adjustably connected to the plate 122 by machine screws 162 which extend upwardly through counterbored openings in plate 160 into threaded openings 164 in plate 122. Openings 164 are layed out in two rows so that the position of bar 160 can be shifted across the plate 122 to any desired location. Connected to bar 160 (see FIGS. 4 and 7) is a bar 166 which is heated by resistance heaters (not shown). Bar 166 is preferably covered with Teflon coated fabric 167 to eliminate sticking of the plastic envelope material during a forming operation.

The overall sequence of operations of the sealing apparatus can best be understood by reference to FIGS. 3 through 7. With the jaws in the spaced apart position shown in FIGS. 3 and 4, a pair of sheets of suitable foam plastic material 180 and 182 are positioned on the upwardly extending portions of the jaw portion 56 of the lower bar 54. As best shown in FIG. 3, the sheets 180, 182 are preferably to be closely received within the guide legs 80 of bar 78. With the sheets in position on the lower jaws, the upper plate is actuated downwardly to the position shown in FIGS. 5 through 7. The heated jaws thus cause the sheets to be bonded together along their outer periphery. Because of the arrangement of the jaws, all three edges are simultaneously joined. It should be noted that the bars 80 cooperate with the upper clamp bars 138 to guide them into position on the lower jaw members. Further, the bars also serve to position the sheets.

The invention has been described in great detail sufficient to enable one of ordinary skill in the art to make and use the same. Obviously, modifications and alterations of the preferred embodiment will occur to others upon a reading and understanding of the specification and it is my intention to include all such modifications and alterations as part of my invention insofar as they come within the scope of the appended claims.

What is claimed is:

1. Apparatus for forming sealed foam plastic envelopes of a given desired size comprising:
    a. a pair of platens having opposed faces;
    b. support means for supporting said platens with their opposed faces generally parallel and in alignment;
    c. power means for producing relative movement between said platens to permit them to be selectively moved from a first position wherein their opposed faces are spaced a substantial distance apart to a second position wherein their opposed faces are relatively closely spaced;
    d. adjustable jaw assembly means carried on each of said platens, each of said jaw assembly means including at least three margin defining jaw portions fixed in desired relation on each platen, the jaw portions including one pair of elongated jaw portions in side-by-side parallel alignment on each platen and arranged to mate in face-to-face relation when the platens are moved to the second position, and an intermediate jaw portion mounted on each platen in face-to-face relation with its opposing intermediate jaw portion and extending between the elongated jaw portions to define therewith opposed co-operating jaw assemblies of generally U-shaped and desired size;
    e. adjusting means for permitting the spacing between the parallel elongated jaw portions to be selectively varied for envelopes of different size; and,
    f. means for causing the jaw portions to impart energy to plastic sheets positioned therebetween to bond said sheets into an envelope of desired size.

2. The apparatus as defined in claim 1 wherein said platens are mounted horizontally and wherein said power means moves one of said platens vertically.

3. The apparatus as defined in claim 1 wherein said platens have an access opening at a location adjacent said jaw members.

4. A foam envelope margin sealing apparatus comprising:
    first and second opposed platens;
    power means for producing relative movement between said platens to move them to a first position wherein they are spaced a substantial distance apart and a second position wherein they are closely spaced;

a first set of jaw defining jaw portions carried on said first platen and including a first pair of generally parallel, elongated jaw portions in spaced side-by-side relationship and a first intermediate jaw portion extending transversely between said first pair;

a second set of jaw defining jaw portions carried on said second platen in opposing relation to said first set of jaw defining jaw portions and including a second pair of generally parallel, elongated jaw portions in spaced, side-by-side relationship and a second intermediate jaw portion extending transversely between said second pair;

said first and second pairs of parallel jaw portions being adjustably mounted on their respective platens in a manner to permit lengthening or shortening their relative spacing; and said first and second intermediate jaw portions being connected to their respective platens in a manner to permit them to be removed from said platens or shifted longitudinally along said pairs of parallel jaw portions.

5. Apparatus for sealing foam plastic sheet material comprising:

first and second opposed platens mounted for relative movement between a first position in which they are spaced a substantial distance apart and a second position wherein they are relatively closely spaced;

each platen carrying and adjustable jaw assembly including two elongated, spaced side-by-side jaw portions and one intermediate jaw portion extending transversely between said spaced side-by-side jaw portions;

the jaw assembly of each platen being aligned with the jaw assembly of the opposed platen so that upon relative movement of the platens to the second position, the jaw assemblies telescopingly come into co-operating relationship with their sealing surfaces in opposing face-to-face relationship, first means for permitting spacing between the side-by-side jaw portions to be readily varied; and, second means for permitting the position of said intermediate jaw portions to be adjusted longitudinally of said side-by-side jaw members such that the length of margin defining sealed portions of envelopes can be varied.

* * * * *